United States Patent
King et al.

(10) Patent No.: US 8,667,075 B1
(45) Date of Patent: Mar. 4, 2014

(54) SYSTEM AND METHOD FOR IMPLEMENTING A SUBSCRIPTION-BASED SOCIAL MEDIA PLATFORM

(71) Applicant: Upfront Media Group, Inc., New York, NY (US)

(72) Inventors: Jeffrey Shaun King, Laguna Niguel, CA (US); Ray Lee, New York, NY (US); Vincent Tuscano, New York, NY (US)

(73) Assignee: Upfront Media Group, Inc., New York, NY (US)

( * ) Notice: Subject to any disclaimer, the term of this patent is extended or adjusted under 35 U.S.C. 154(b) by 0 days.

(21) Appl. No.: 14/025,523

(22) Filed: Sep. 12, 2013

Related U.S. Application Data (60) Provisional application No. 61/811,958, filed on Apr. 15, 2013.

(51) Int. Cl.
*G06F 15/16* (2006.01)
(52) U.S. Cl.
USPC .......................................................... 709/206
(58) Field of Classification Search
None
See application file for complete search history.

(56) References Cited

U.S. PATENT DOCUMENTS

| | | | |
|---|---|---|---|
| 8,429,189 B1 * | 4/2013 | Spielberg et al. | 707/770 |
| 8,438,246 B2 * | 5/2013 | Alnas | 709/219 |
| 8,589,992 B2 * | 11/2013 | Babic | 725/87 |
| 2011/0041171 A1 * | 2/2011 | Burch et al. | 726/7 |
| 2011/0296473 A1 * | 12/2011 | Babic | 725/87 |
| 2011/0296474 A1 * | 12/2011 | Babic | 725/87 |
| 2011/0320550 A1 * | 12/2011 | Lawson et al. | 709/206 |
| 2012/0066348 A1 * | 3/2012 | Alnas | 709/219 |
| 2012/0311049 A1 * | 12/2012 | Johansson et al. | 709/206 |
| 2013/0081128 A1 * | 3/2013 | Gupta et al. | 726/9 |
| 2013/0179488 A1 * | 7/2013 | Wang et al. | 709/203 |
| 2013/0212215 A1 * | 8/2013 | Ukkola et al. | 709/217 |

* cited by examiner

*Primary Examiner* — Brian P Whipple
(74) *Attorney, Agent, or Firm* — Wilmer, Cutler, Pickering, Hale and Dorr LLP (57) ABSTRACT

Systems and methods for implementing a subscription-based social media platform are provided. A content creator generates live content on a mobile device and sends requests to a server for initializing a live stream from the mobile device. The server sends requests to encoding service providers. The encoded live content is send to a content storage server. Subscribers of the social media platform can access the live content on their mobile devices from the content storage server.

11 Claims, 8 Drawing Sheets

SYSTEM AND METHOD FOR
IMPLEMENTING A SUBSCRIPTION-BASED
SOCIAL MEDIA PLATFORM

CROSS-REFERENCE TO RELATED
APPLICATIONS

This application claims priority under 35 U.S.C. §119(e) to U.S. Provisional Patent Application No. 61/811,958, filed on Apr. 15, 2013, entitled "Subscription-Based Social Media Platform," the content of which is hereby incorporated in its entirety.

FIELD OF THE INVENTION

The present invention relates to computer-based systems and methods for providing a subscription-based social media platform.

BACKGROUND OF THE INVENTION

Social media platforms utilize mobile and web-based technologies to create highly interactive environments through which individuals and communities share, co-create, discuss, and modify user-generated content. However, some social media platforms limit the way by which a user can share content. For example, some social media do not incorporate email, phone calls, or live video feeds in their supported technologies.

SUMMARY

The present invention is directed to systems and methods for implementing subscription-based social media. The disclosed system includes a robust subscription-based publishing platform that enables sharing of premium content in one place, for example, photos, videos, SMS messages, email, phone calls, live videos, and more, using an application (app) running on a mobile device. By using the disclosed systems and methods, influential people and brands in the world can connect directly with their most devoted fans, thereby building a true community.

A method for implementing a subscription-based social media platform is provided. The method includes the steps of receiving an application programming interface (API) request for initializing a live stream from a mobile device, the API request generated by an application running on the mobile device. The method also includes storing metadata information of the received API request in a database coupled to the server and sending a REpresentational State Transfer (REST) request to an encoding service provider, the REST request comprising a request for a plurality of bitrate Real Time Messaging Protocol ("RTMP") stream configurations. The method further includes receiving an RTMP protocol location from the encoding service provider, storing RTMP stream information in the database, sending the RTMP protocol location to the mobile device, receiving a first notification from the mobile device that the mobile device has initiated the live stream, and sending a second notification to the database that the mobile device has initiated the live stream.

Under alternative embodiments of the present invention, a method for implementing a subscription-based social media platform includes the steps of sending to a server an application programming interface (API) request for initializing a live stream, the API request generated by an application running on the mobile device, the API having metadata information being stored to a database and receiving a REpresentational State Transfer (REST) protocol location by the server, in response to an REST request to an encoding service provider, the REST request comprising a request for a plurality of bitrate Real Time Messaging Protocol ("RTMP") stream configurations. The method further includes the steps of sending a first notification to the server that the mobile device has initiated the live stream, encoding the live stream, generating packets of encoded live stream data from the encoded live stream, and sending the encoded live stream packets to an encoding service provider.

Under alternative embodiments of the present invention a method for implementing a subscription-based social media platform includes the steps of receiving from a content creator a REST API request for initializing at least one of an email, a short message service (SMS) message, and a voice message and determining a plurality of subscribers with subscription to receive content from the content creator. The method further includes the steps of retrieving from a database information about the plurality of subscribers, and (a) sending to an email service provider the REST API request, information about the plurality of subscribers, and the content from the content creator, if the REST API request is a request for an email address, (b) sending to an SMS message service provider the REST API request, information about the plurality of subscribers, and the content from the content creator, if the REST API request is a request for an SMS message, and (c) if the REST API request is a request for a voice message, (1) sending to a content storage server an audio file corresponding to the content from the content creator, (2) sending to an encoding service provider the REST API request, and (3) sending to a voice service provider the REST API request, in response to notification from the encoding service provider that the audio file is encoded.

These and other embodiments of the present invention will be described in greater detail in the remainder of the specification referring to the drawings.

DETAILED DESCRIPTION

The present invention is directed to systems and methods for implementing subscription-based social media. The disclosed systems and methods build exclusive online communities for people of influence and their fans. The disclosed system includes a robust subscription-based publishing platform with more ways to share premium content in one place, for example, photos, videos, SMS messages, email, phone calls, live videos, and more, compared to existing platforms. By using the disclosed systems and methods, influential people and brands in the world can connect directly with their most devoted fans, by building a true community. Under an embodiment of the present invention the subscription-based platform is advertisement free and spam free.

Figure 1:
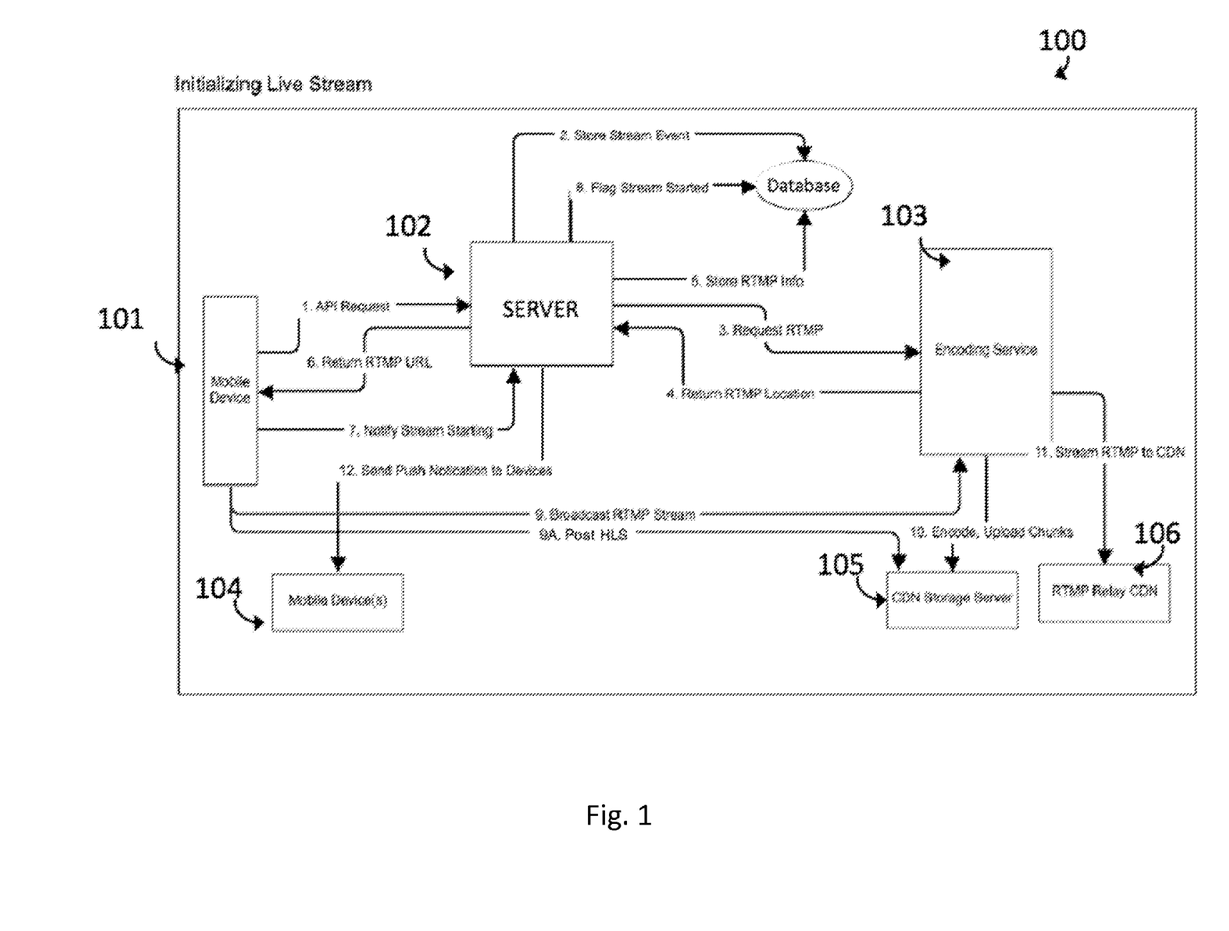
FIG. 1 shows a representative system for initializing a live stream originating from a mobile device according to aspects of the invention.
Figure 2:
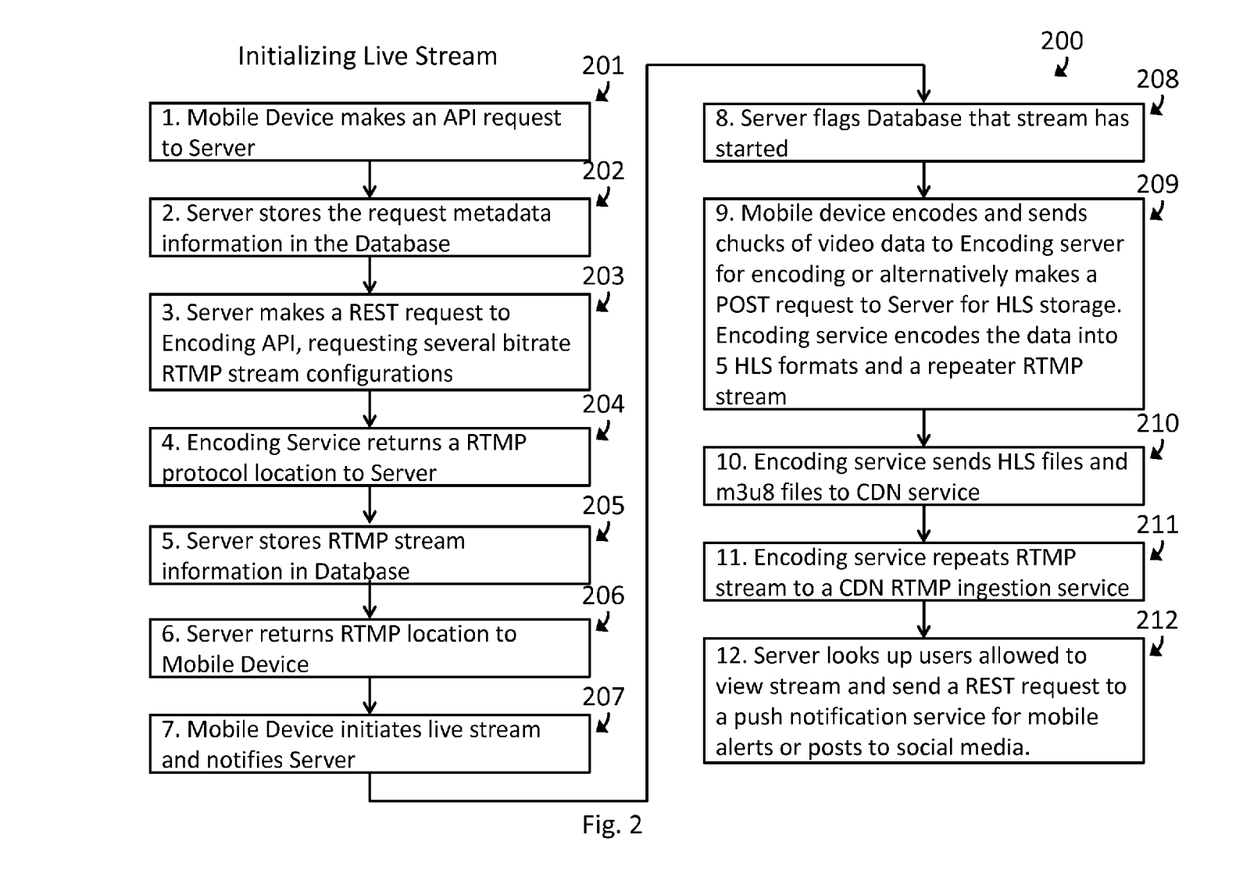
FIG. 2 shows exemplary steps for initializing a live stream from a mobile device according to aspects of the invention.

FIG. 1 shows a system 100 for initializing a live stream originating from a mobile device. An application running on the mobile device can facilitate capturing the live stream using one or more cameras of the mobile device. The live stream can be broadcasted and streamed to other mobile, tablet or computer devices, according to aspects of the disclosure. FIG. 2, generally at 200, discloses exemplary steps for initializing a live stream from a mobile device using an application running on the mobile device. In connection with FIGS. 1 and 2, an application or "app" running on a content source mobile device 101 makes an Application Programming Interface ("API") request to a server 102 (201), for initializing a live stream from the mobile device 101 using an application running on the mobile device. Server 102 stores the metadata information of the API request in a database 107 (202). In addition, server 102 makes a REpresentational State Transfer ("REST") request to an encoding service provider 103, requesting a plurality of bitrate Real Time Messaging Protocol ("RTMP") stream configurations 203.

The encoding service provider 103 returns an RTMP protocol location to the server 102 (204), and in response, the server 102 stores the RTMP stream information in the database (205) and returns the RTMP location to the mobile device 101 (206).

The app running on the mobile device 101 then initiates the live stream (207) and notifies the server 102 that there is a stream initiating. Server 102 then notifies the database 107, for example, using a flag, that the stream has initiated (208).

The app running on the mobile device 101 instructs the mobile device to start encoding and to send chunks of the video data to the encoding service provider 103 or alternatively makes POST request to server 102 for HTTP Live Streaming ("HLS") storage (209). The encoding service provider 103 encodes the video data into one or more streams. In addition, the encoding service provider 103, sends files, for example, HLS and/or m3u8 files, to a content delivery network ("CDN") 105 (210). The encoding service provider further repeats the RTMP stream to a CDN RTMP ingestion service 106 (211).

Server 102 looks up users who are subscribed to particular services and are allowed to view a stream from mobile, tablet or computer device 101, and then sends push notifications or SMS to one or more mobile devices 104 for alerting them about the live stream or post to social media, for example, Twitter or Facebook, alerting that the live stream (212).

Figure 3:
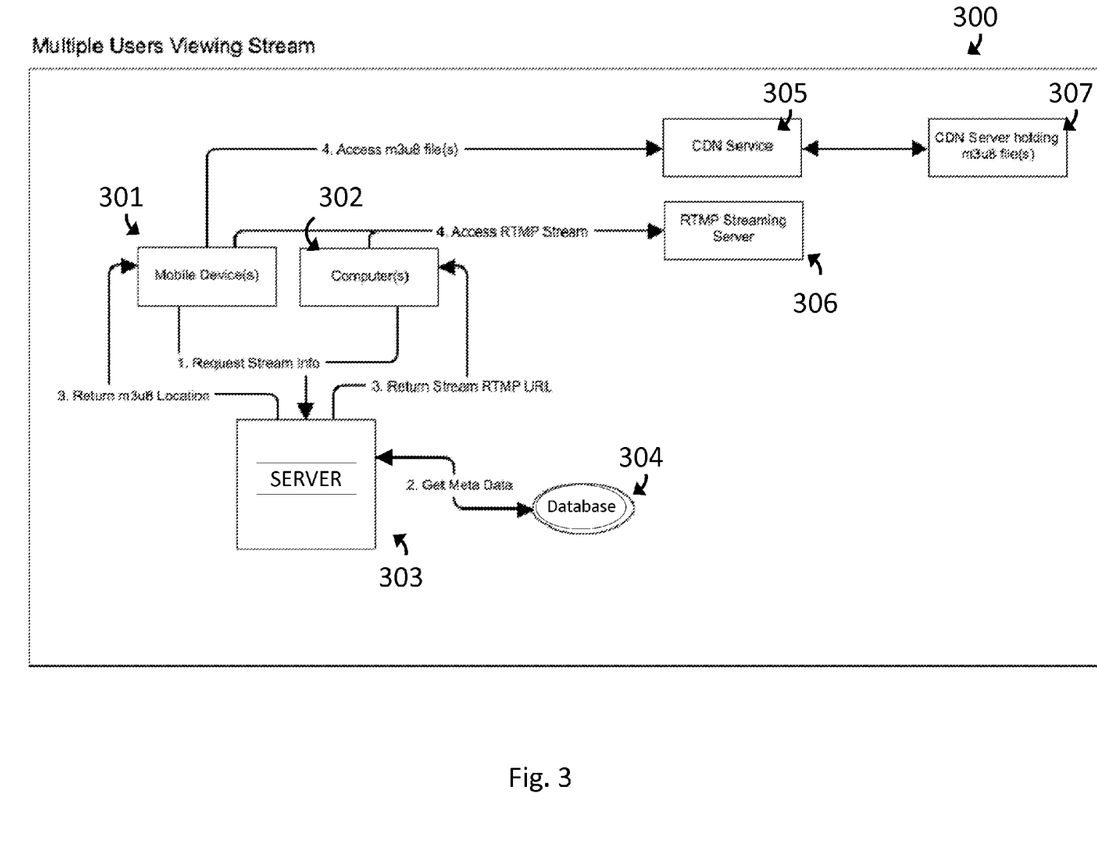
FIG. 3 shows a representative system for allowing multiple users to view a stream according to aspects of the invention.
Figure 4:
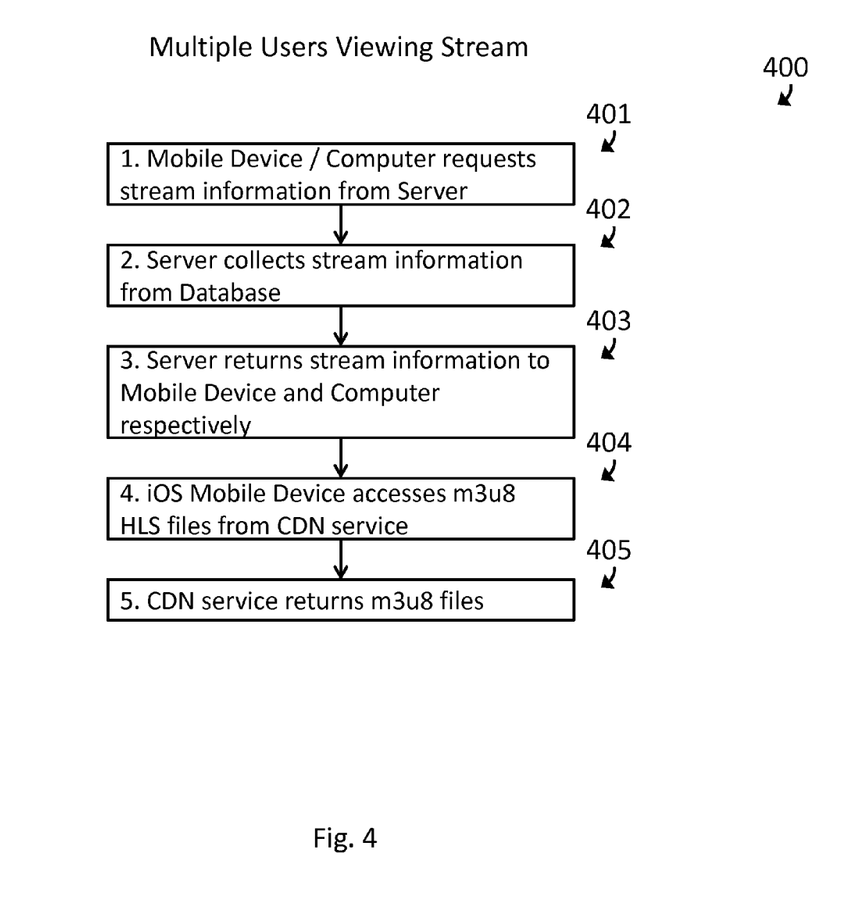
FIG. 4 shows a representative method for allowing multiple users to view a stream according to aspects of the invention.

FIGS. 3 and 4 show an exemplary system 300 and method 400 for allowing multiple users to view a stream, respectively. In connection with FIGS. 3 and 4, a request for stream information can originate from any device, for example, a mobile device 301, a personal computer 302, and a tablet (401). The user request is received by a server 303. After the server receives the request, the server collects stream information from a database 304 (402) and returns stream information to the user device (403). For example, the server can return a stream RTMP Universal Resource Location ("URL") to a computer or an m3u8 location to a mobile device. The user device can access the content from an RTMP 306 streaming server or a CDN service 305 coupled to a CDN Server 307 holding m3u8 files (404). Then the CDN service returns the m3u8 files to the mobile device (405).

Figure 5:
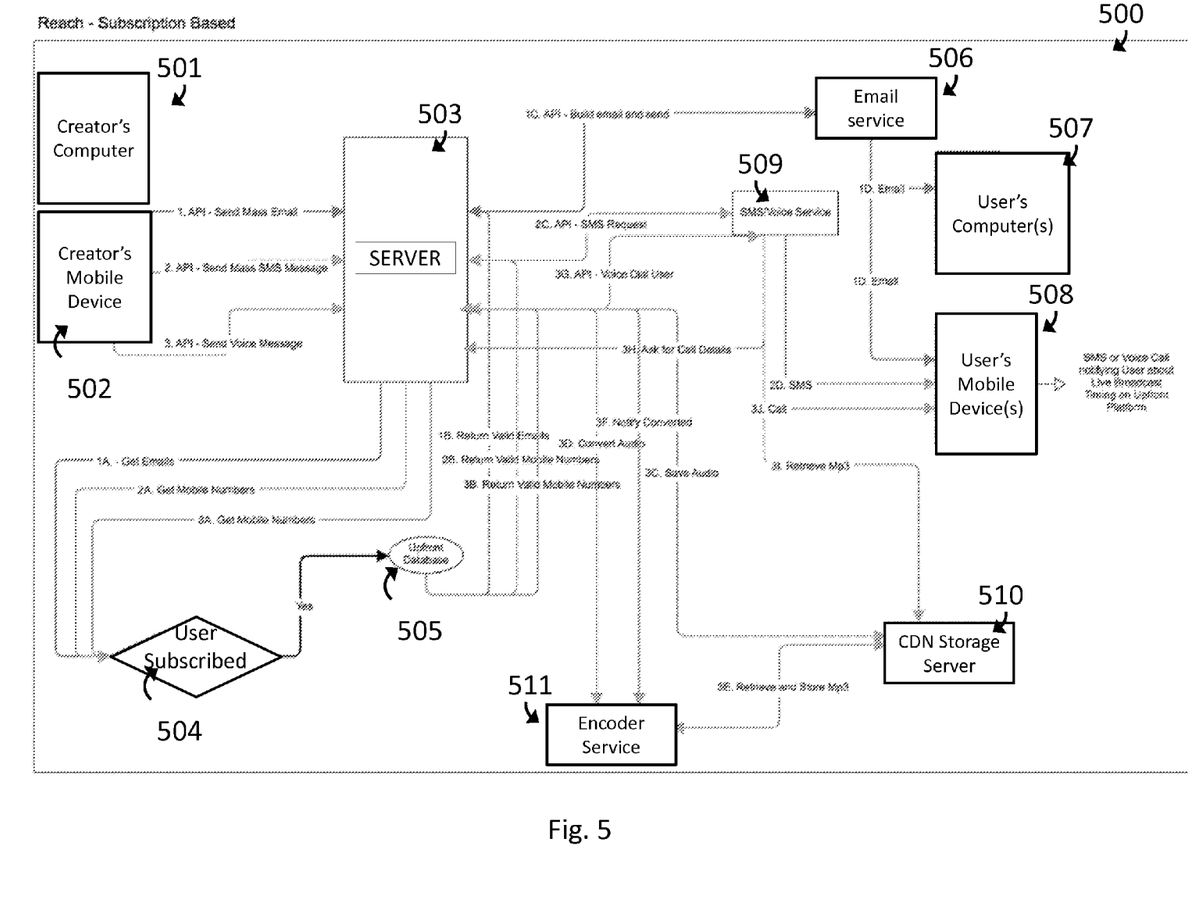
FIG. 5 shows a representative system for enabling a content creator using an app on a mobile device to reach a plurality of users subscribed to a particular service according to aspects of the invention.
Figure 6:
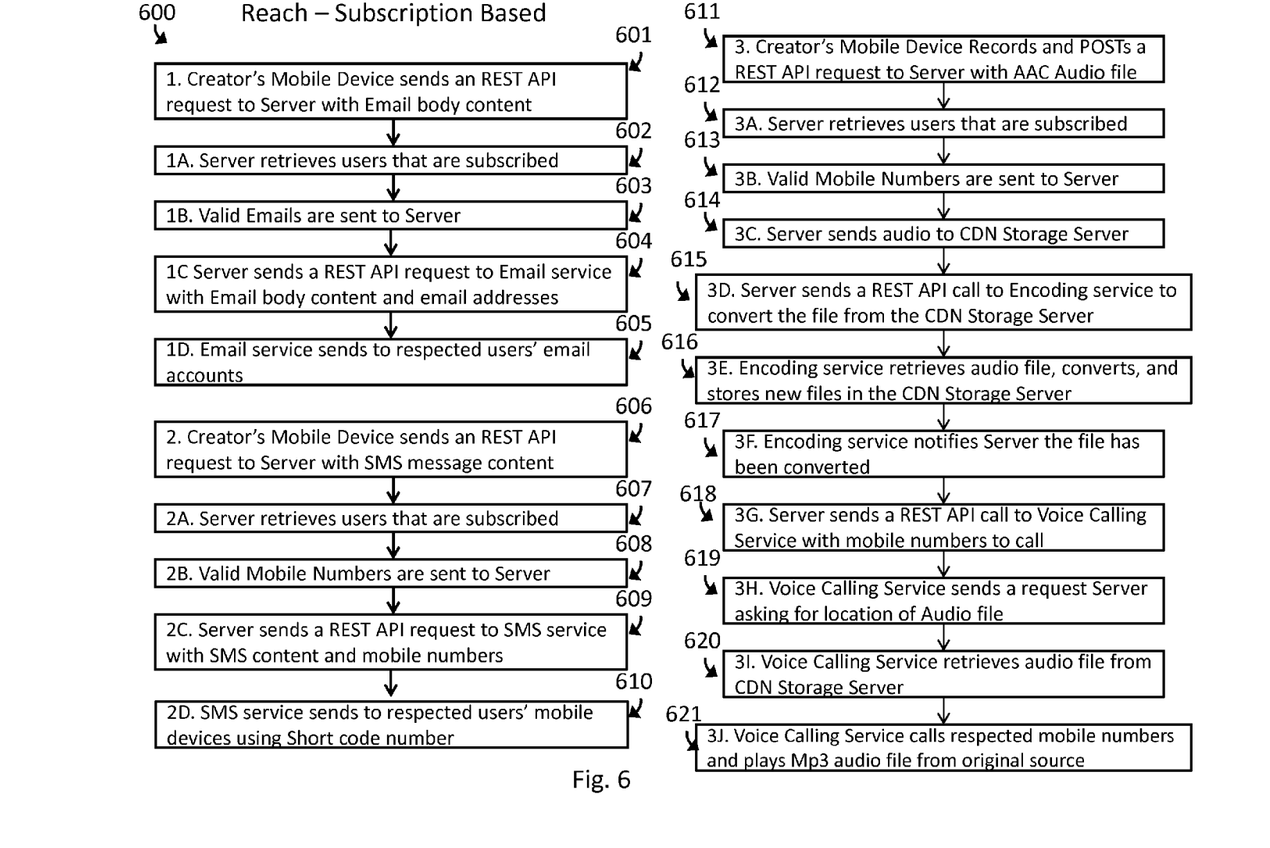
FIG. 6 shows a representative method for enabling a content creator using an app on a mobile device to reach a plurality of users subscribed to a particular service according to aspects of the invention.

FIGS. 5 and 6 show an exemplary system 500 and method 600, respectively, for enabling a content creator using an app on a mobile device to reach a plurality of users subscribed to a particular service.

The system 500 can reach particular users based on their geographic profile information, therefore allowing geo-targeting of users. When users subscribe to a particular service, they can specify geographic information, for example, their country, city of residence, zip code, or address. The disclosed system can use different technologies to reach a particular audience, based on user-provided geographic information. The disclosed systems and methods allow a content creator using an app running on their mobile device to connect to their members, for example, using an SMS message, a voice call directly to the recipients' phone, and/or an email. For example, a content creator can:

1) Send a private SMS message only to those members located in California.

2) Send a private Voice Call to members located in New York, New Jersey, and Philadelphia.

3) Send a private SMS message to all of Europe

4) Send a private Email only to the members in the United States.

The targeted communication can be based on, for example, the zip code from the user's profile, and allows the content creator to geographically target exactly where to send each reach method.

FIGS. 5 and 6 show three different ways for reaching the plurality of users. A content creator can either create content on a computer 501 or a mobile device 502, using an application running on the computer or the mobile device. Under a first embodiment, the content creator app sends a REST API request to a server 503, with an email body content (601). The server retrieves user email addresses that are subscribed to a particular service or are subscribed to receive content from the particular content creator 504 (602). Valid email addresses are returned from a database 505 to the server 503 (603). Then the server 503 sends a REST API request to an email service provider 506 and also provides the email service provider 506 with the email body content and email addresses (604). In response, the email service provider sends emails with the received email body content to the received email addresses (605), which can be received at a user's computer 507 or mobile device 508.

Under an alternative embodiment, an app running on a creator's mobile device 502 sends an REST API request to a server 503, with SMS message content (606). The server 503 retrieves information on the users that are subscribed to receive content from the content creator 504 (607). A database 505 sends the mobile numbers of the subscribed users to the server 503 (608). In response, the server 503 sends a REST API request to an SMS service provider 509 with SMS content generated using the app running on the mobile device and the mobile numbers of the subscribed users (609). The SMS service provider 509 sends to the subscribed users' mobile devices an SMS notifying the users, for example, about a live broadcast from the content creator (610).

Under an alternative embodiment, an app running on a creator's mobile device 502 records and posts a REST API request to a server 503, with an audio file, for example, an AAC Audio file (611). The server 503 retrieves information from users that are subscribed to receive content from the particular creator 504 (612). A database sends mobile numbers of the subscribed users to the server (613). The server 504 sends the audio file to a CDN storage server 510 (614) and further sends a REST API call to an encoding service provider 511 to convert the audio file from the CDN storage server 510 (615).

In response, the encoding service provider 511 retrieves the audio file, converts it to one or more files and stores the new file(s) in the CDN storage server 510 (616). In addition, the encoding service provider 511 notifies the server 503 that the audio file has been converted (617). In response, the server sends a REST API call to a voice calling service 509 with a list of mobile numbers to be called (618).

The voice calling service 509 sends a request to the server 503 asking for a location of the audio file that is to be transmitted to subscribed users (619), and consequently, retrieves the audio file from the CDN storage server 510 (620). In addition, the voice calling service 509 calls the mobile numbers of the subscribers and plays the audio, for example, an mp3 file, from the original source (621).

Figure 7:
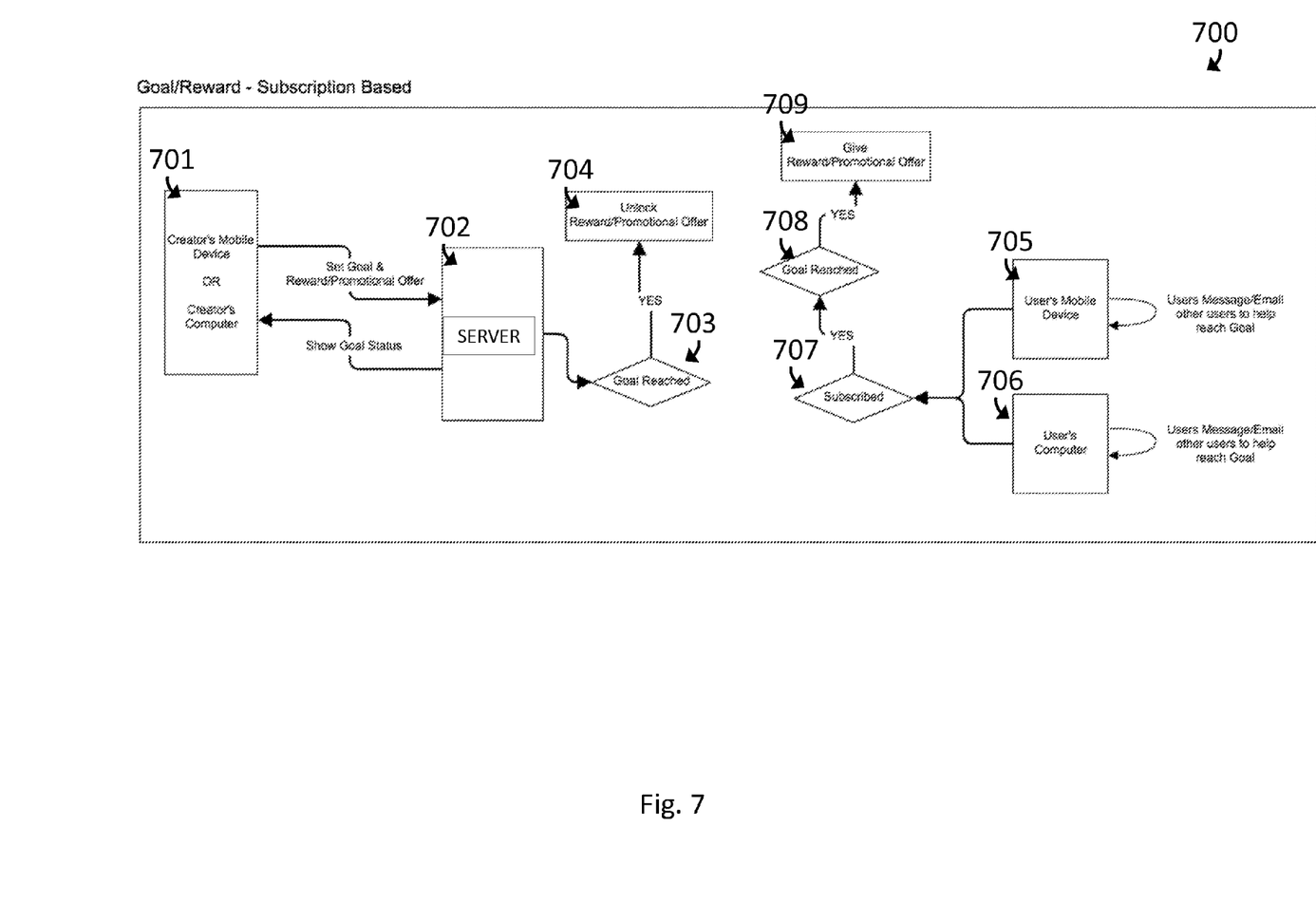
FIG. 7 shows a representative system for implementing a reward subscription program according to aspects of the invention.
Figure 8:
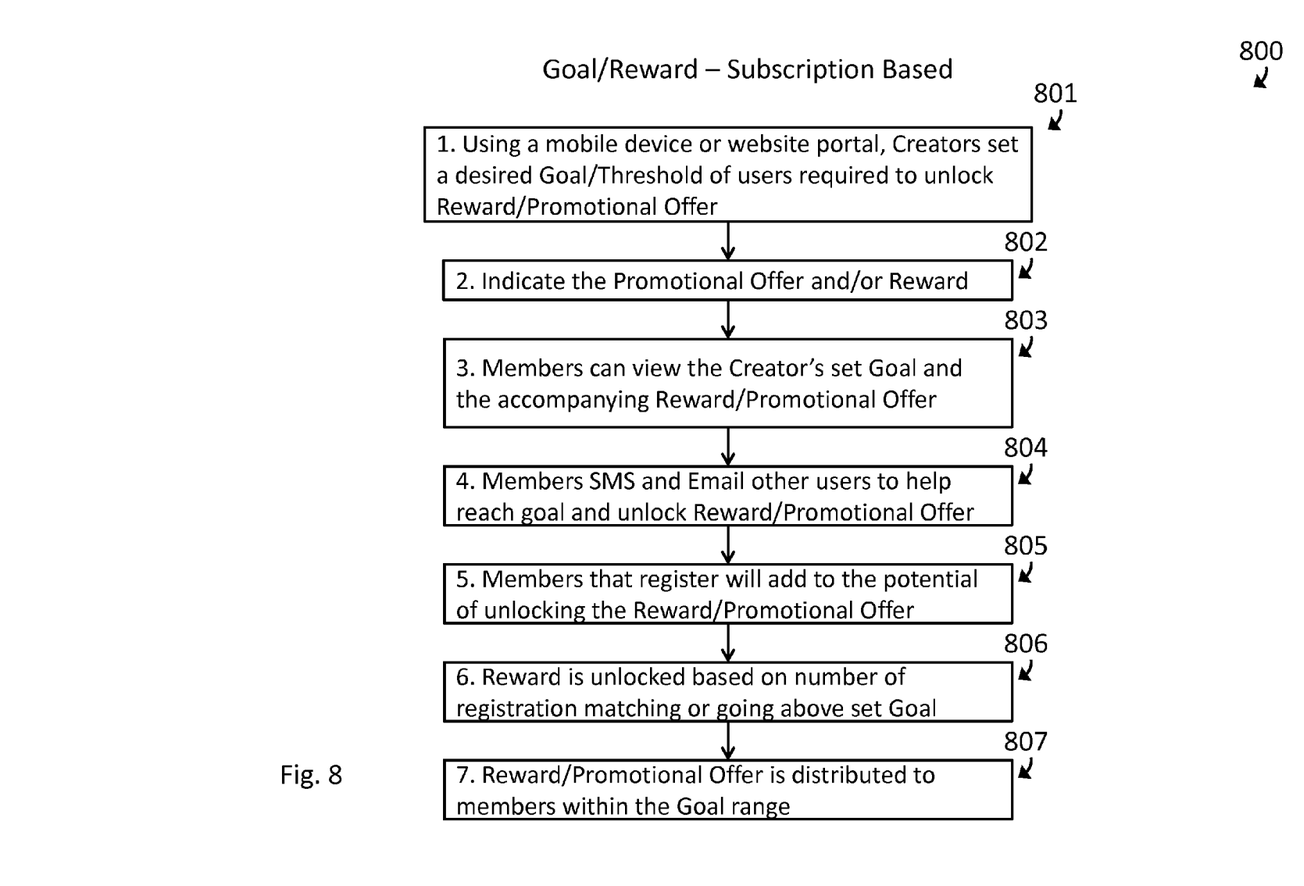
FIG. 8 shows a representative method for implementing a reward subscription program according to aspects of the invention.

FIGS. 7 and 8 show an exemplary system 700 and method 800, respectively, for implementing a goal/reward subscription program. In the system of 700, a creator of the reward program can use, for example, a mobile device 701 or website portal in a computer 701, to set a desired goal or threshold that users are required to meet to unlock a particular reward or promotional offer (801). The goal and reward or promotional offer can be communicated to a server 702 (802). Server 702 can report back to the creator of the reward program the goal status for each user and further check whether a particular goal has been reached 703. If the goal is reached, then the reward or promotional offer is unlocked and made available to the user. The creator can indicate the promotional offer and/or reward and members of the program view the creator's set goal and the accompanying reward or promotional offer (803). The goal, for example, can be to refer other mobile users to subscribe to the same program. Existing members using an application running on a mobile device 705 can, for example, send SMS and/or email to unsubscribed users to help reach the goal and unlock the reward or promotional offer (804). The existing members can alternatively use a computer 706 to send a message or email to unsubscribed users. The unsubscribed users who actually register 707 can add to the potential of unlocking the reward or promotional offer (805). For example, a reward can be unlocked if a specific number of unregistered users end up subscribing for the program (806). For the users who reach the goal 708 the reward or promotional offer is distributed by the system 709 (807). According to aspects of the present invention the creator of the reward program can be a creator of particular content that users subscribe to.

The descriptions herein are applicable in any computing or processing environment. Embodiments of the disclosed subject matter can be implemented in computer hardware, firmware, and/or computer programs executing on programmable computers, mobile devices, or servers that each includes a processor and a storage medium readable by the processor (including volatile and non-volatile memory and/or storage elements). A "server," "client," "agent," "module," "interface," and "host" is not software per se and includes at least some tangible, non-transitory hardware that is configured to execute computer readable instructions.

Any computer program can be implemented in a high-level procedural or object-oriented programming language to communicate within and outside of computer-based systems. Any computer program can be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, can also be implemented as a machine-readable storage medium, configured with a computer program, where, upon execution, instructions in the computer program cause a machine to operate to perform the functions of the embodiments described above. The embodiments, or portions thereof, may be implemented using circuitry, such as one or more of programmable logic (e.g., an ASIC), logic gates, a processor, and a memory. While several particular forms of the disclosed subject matter have been described, it will be apparent that various modifications are possible. It is not intended that the disclosed subject matter be limited to the particular embodiments described here. Other advantages and novel features of the disclosed subject matter may become apparent from the detailed description when considered in conjunction with the drawings Embodiments of the disclosed subject matter can be used in a variety of applications. Although the embodiments, or portions thereof, are not limited in this respect, the embodiments, or portions thereof, can be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above can also be implemented using integrated circuit blocks referred to as main memory, cache memory, or other types of memory that store electronic instructions to be executed by a microprocessor or store data that may be used in arithmetic operations.

It is particularly noted that the persons skilled in the art can readily combine the various technical aspects of the various exemplary embodiments described as well as their constituent elements and sub-systems to implement features and processes contemplated to be within the scope of the disclosed subject matter but not literally or explicitly described.

It is to be understood that the disclosed subject matter is not limited in its application to the details of construction and to the arrangements of the components set forth in this description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Various modifications to the disclosed embodiments will be apparent to those skilled in the art, and the general principals set forth below may be applied to other embodiments and applications. Thus, the present invention is not intended to be limited to the embodiments shown or described herein.

What is claimed is:

1. A method for implementing a subscription-based social media platform comprising the steps of:
  a server receiving an application programming interface (API) request for initializing a live stream from a mobile device, the API request generated by an application running on the mobile device;

the server storing metadata information of the received API request in a database coupled to the server;

the server sending a REpresentational State Transfer (REST) request to an encoding service provider, the REST request comprising a request for a plurality of bitrate Real Time Messaging Protocol ("RTMP") stream configurations;

the server receiving an RTMP protocol location from the encoding service provider;

the server storing RTMP stream information in the database;

the server sending the RTMP protocol location to the mobile device;

the server receiving a first notification from the mobile device that the mobile device has initiated the live stream; and the server sending a second notification to the database that the mobile device has initiated the live stream.

2. A method for implementing a subscription-based social media platform comprising the steps of:

a mobile device sending to a server an application programming interface (API) request for initializing a live stream, the API request generated by an application running on the mobile device, the API request having metadata information configured to be stored to a database;

the mobile device receiving a REpresentational State Transfer (REST) protocol location by the server, in response to an REST request to an encoding service provider, the REST request comprising a request for a plurality of bitrate Real Time Messaging Protocol ("RTMP") stream configurations;

the mobile device sending a first notification to the server that the mobile device has initiated the live stream;

the mobile device encoding the live stream;

the mobile device generating packets of encoded live stream data from the encoded live stream; and the mobile device sending the encoded live stream packets to an encoding service provider.

3. The method of claim 2, further comprising:

the encoding service provider encoding the encoded live stream packets into at least one encoded stream;

the encoding service provider sending the at least one encoded stream to at least one of a content delivery network and an RTMP server;

the server determining a plurality of subscribers with privileges to receive the at least one encoded stream;

the server sending notifications about the at least one encoded stream to the plurality of subscribers with privileges to receive the at least one encoded stream;

receiving by at least one subscriber mobile device the at least one encoded stream from the at least one of a content delivery network and an RTMP server.

4. The method of claim 2, further comprising:

the encoding service provider encoding the encoded live stream packets into at least one encoded stream;

the encoding service provider sending the at least one encoded stream to at least one of a content delivery network and an RTMP server;

the server receiving a plurality of requests to receive live stream information from a plurality of subscribers;

the server collecting the live stream information from the database, in response to the received plurality of requests;

the server sending the live stream information to the plurality of subscribers; and enabling access to the plurality of subscribers to the live stream based on the live stream information.

5. The method of claim 4, wherein the live stream information includes at least one of a stream RTMP Universal Resource Location ("URL") and a m3u8 location.

6. A method for implementing a subscription-based social media platform comprising the steps of:

a server receiving from a content creator a REST API request for initializing at least one of an email, a short message service (SMS) message, and a voice message;

the server determining a plurality of subscribers with subscription to receive content from the content creator;

the server retrieving from a database information about the plurality of subscribers; and the server:

(a) sending to an email service provider the REST API request, information about the plurality of subscribers, and the content from the content creator, if the REST API request is a request for an email address;

(b) sending to an SMS message service provider the REST API request, information about the plurality of subscribers, and the content from the content creator, if the REST API request is a request for an SMS message; and (c) if the REST API request is a request for a voice message:

(1) sending to a content storage server an audio file corresponding to the content from the content creator;

(2) sending to an encoding service provider the REST API request; and (3) sending to a voice service provider the REST API request, in response to notification from the encoding service provider that the audio file is encoded.

7. The method of claim 6, wherein if the REST API request is a request for a voice message, the method further comprises:

the voice service provider retrieving an encoded audio file; and the voice service provider calling the plurality of subscribers and playing the encoded audio file to the plurality of subscribers.

8. The method of claim 7, wherein the plurality of subscribers is selected based on geographic subscriber information.

9. The method of claim 6, further comprising:

the server receiving a defined reward for the plurality of subscribers and a defined goal for the plurality of subscribers in connection with the content created by the content provider;

the server receiving the defined reward and the defined goal; and the server monitoring whether the defined goal is reached for each subscriber.

10. The method of claim 9, wherein the goal for the plurality of subscribers is to cause a number of unsubscribed users to subscribe to a particular service.

11. A method for implementing a subscription-based social media platform comprising the steps of:

a mobile device sending to a server an application programming interface (API) request for initializing a live stream, the API request generated by an application running on the mobile device, the API having metadata information being stored to a database;

the mobile device receiving a REpresentational State Transfer (REST) protocol location by the server, in response to an REST request to an encoding service provider, the REST request comprising a request for a plurality of bitrate Real Time Messaging Protocol ("RTMP") stream configurations;

the mobile device sending a first notification to the server that the mobile device has initiated the live stream;

the mobile device encoding the live stream; and the mobile device making a POST request to the server for HTTP Live Streaming (HLS) storage.

* * * * *